United States Patent [19]

Pierret et al.

[11] Patent Number: 5,095,222

[45] Date of Patent: Mar. 10, 1992

[54] SYSTEM FOR CONTROLLING RAISED-VOLTAGE DEFROSTING OF AN ELECTRIC WINDSHIELD IN A MOTOR VEHICLE

[75] Inventors: Jean-Marie Pierret, Paris; Didier Canitrot, La Quene En Brie, both of France

[73] Assignee: Valeo Equipements Electriques Moteur, Creteil, France

[21] Appl. No.: 500,806

[22] Filed: Mar. 28, 1990

[30] Foreign Application Priority Data

Mar. 31, 1989 [FR] France ............... 89 04307

[51] Int. Cl.⁵ .................................... B60L 1/02
[52] U.S. Cl. .................... 307/10.1; 219/202; 219/203
[58] Field of Search ............ 307/9.1, 10.1; 219/200, 219/201, 202, 203, 482, 488, 492, 497, 499, 507, 508, 509, 522; 98/2.08, 2.09, 2.10; 165/41, 42

[56] References Cited

U.S. PATENT DOCUMENTS

| | | | |
|---|---|---|---|
| 3,469,073 | 9/1969 | Zechin | 307/10.1 X |
| 3,571,560 | 3/1971 | Nilssen | 219/202 X |
| 3,576,970 | 5/1971 | Cherry | 219/202 X |
| 3,585,358 | 6/1971 | Nilssen | 219/202 X |
| 3,668,514 | 6/1972 | Peck | 307/10.1 X |
| 4,084,126 | 4/1978 | Clements | 219/203 X |
| 4,117,390 | 9/1978 | Iwata | 219/202 X |
| 4,263,543 | 4/1981 | Watrous et al. | 219/202 X |
| 4,267,433 | 5/1981 | Sahm, III | 219/203 X |
| 4,673,797 | 6/1987 | Weirick | 219/203 |
| 4,678,982 | 7/1987 | Offiler et al. | 219/202 X |
| 4,692,684 | 9/1987 | Schaeffer | 219/202 X |
| 4,862,055 | 8/1989 | Maruyama et al. | 219/203 X |
| 4,884,018 | 11/1989 | Meuret et al. | 219/203 X |

FOREIGN PATENT DOCUMENTS

84/03595 3/1984 PCT Int'l Appl. .

*Primary Examiner*—Bentsu Ro

[57] ABSTRACT

A control member is connected to an air-conditioning computer and it receives therefrom a signal for triggering defrosting of the windshield. Switch-over means are connected to the rectified output of the alternator and connect the output either to the network for distributing electrical energy at the nominal voltage of the vehicle battery, or else to a network for feeding the electric windshield. The control member is constituted by a logic unit delivering a plurality of sequential control signals. These signals include at least one signal for controlling de-excitation of the inductor of the alternator, which signal is delivered to the excitation regulator, and a switchover control signal for controlling the switchover means. Raised-voltage regulation is inhibited so long as the battery is connected to the rectified output of the alternator and it is enabled when the windshield is connected to the rectified ouptut of the alternator. The invention is applicable to power supply circuits in motor vehicles, including heavy goods vehicles, utility vehicles, and private cars.

13 Claims, 5 Drawing Sheets

OC : open circuit
SC : short circuit

| Faults | Regulation under nominal voltage conditions | | | Raised voltage conditions | | PBE |
|---|---|---|---|---|---|---|
| | Effects | Diagnosis OC | SC | Effects | Diagnosis OC (S2) | SC (S1) |
| Battery wire break (A) | None Ureg = 14.5V | 0 | 0 | None Ureg = 14.5V | 0 | 0 |
| Relay wire break (B) | Ureg = 0V LT ON | 0 | 0 | Ureg = 0 LT ON | 0 | 1 |
| Regulation wire break PBE (C) | None Ureg = 14.5V | 1 | 0 | Ureg = 0 LT ON | 0 | 1 |
| Sense wire break REI (D) | Ureg = 0 LT ON | 0 | 0 | Ureg = 0 LT ON | 0 | 1 |
| Alternator wire break (E) | Ureg = f(N) | 0 | 0 | Ureg = 0 LT ON | 0 | 1 |
| PBE break (F) | None Ureg = 14.5V | 1 | 0 | None Ureg = 70V | 1 | 0 |
| PBE short (G) | None Ureg = 14.5V | 0 | 0 | Ureg = 0 LT ON | 0 | 1 |
| Relay stuck on PBE (position 2) (H) | Ureg = 0 LT ON | 1 | 0 | None Ureg = 70V | 0 | 0 |
| Relay stuck on battery (position 1) (I) | None Ureg = 14.5V | 0 | 0 | Ureg = 14.5V | 0 | 1 |
| SWITCHED OFF | Ureg = 0V | 0 | 0 | Ureg = 0 | 0 | 0 |

FIG.4b

SYSTEM FOR CONTROLLING RAISED-VOLTAGE DEFROSTING OF AN ELECTRIC WINDSHIELD IN A MOTOR VEHICLE

The present invention relates to a system for controlling raised-voltage defrosting of an electric windshield in a motor vehicle.

BACKGROUND OF THE INVENTION

In order to defrost electric windshields in motor vehicles quickly, proposals have already been made to feed electric windshield with electricity at a raised-voltage in order to ensure effective defrosting action in a short length of time, not exceeding a few minutes.

Such high-speed defrosting systems are described, for example, in French patent applications Nos. 86 07403 and 87 04504 in the name of the present applicant.

In the above-mentioned systems, a raised feed voltage (with raised-voltage conditions reaching as much as 5 to 6 times the nominal charged voltage of the motor vehicle battery) is applied to the electric windshield by changing the regulation level for the rectified output voltage from the alternator.

In the above-mentioned systems, the change in regulation level is controlled in a manner which does not take account of the state of the switching device which directs electrical energy from the alternator to the battery for the purpose of recharging the battery or to the electric windshield for the purpose of defrosting it.

In particular, if there is a switching fault, the above-mentioned systems are capable of overcharging the battery which can have damaging or dangerous consequences, for example destroying the vehicle lamps, running the risk of fire, or even the risk of the battery exploding.

Such a situation may arise when the above-mentioned defrosting system is put into action while a fault in the switching device maintains an unwanted connection between the rectified output from the alternator and the battery.

In addition, in the above-mentioned systems, the function of reactivating the regulator remains active so long as the defrosting system and thus the switching device are in action, i.e. for several minutes.

Consequently, if there exists a fault short-circuiting the feed line to the electric windshield, the alternator delivers all of its energy to the short circuit throughout the defrosting period. This situation also runs the risk of damaging the vehicle, in particular by fire.

The object of the present invention is to implement a system for controlling raised-voltage defrosting of the electric windshield in a motor vehicle, in which the abovementioned drawbacks are eliminated.

Another object of the invention is in particular to implement a control system for raised-voltage defrosting of the electric windshield of a motor vehicle which eliminates the danger of the regulator operating to provide raised-voltage regulation of the rectified output from the alternator while the battery is connected to the switching device at the rectified output from the alternator.

Another object of the present invention is to implement a control system for raised-voltage defrosting of the electric windshield in a motor vehicle in which the operation of the regulator to provide raised-voltage regulation of the rectified output from the alternator is not, in fact, enabled unless a connection is established between the alternator and the feed line to the windshield.

Another object of the present invention is to implement a system for controlling raised-voltage defrosting of the electric windshield in a motor vehicle in which the time actually required for reactivating the alternator, during which time the inductor of the alternator is excited in full field, is limited to a length of time equal to a fraction of the defrosting time.

SUMMARY OF THE INVENTION

The present invention provides a system for controlling raised-voltage defrosting of the electric windshield of a motor vehicle, the system including an air-conditioning computer and a battery-charging alternator, excitation of the inductor of said alternator being controlled via an excitation regulator, wherein the system includes:

a control member connected to said air-conditioning computer, said control member receiving a signal for triggering the defrosting of the windshield from said air-conditioning computer, and transmitting a plurality of state monitoring signals to said air-conditioning computer, said control member being constituted by a logic unit delivering a plurality of sequential signals;

switch-over means connected to the rectified output from the alternator and serving to connect said rectified output from the alternator, either to the network for delivering electrical energy at the nominal voltage of the vehicle battery, or else to the network for feeding the electric windshield, said plurality of sequential control signals including at least:

a signal for controlling de-excitation of the inductor of the alternator, said signal being delivered to said excitation regulator; and a switch-over control signal for controlling said switchover means, with raised-voltage regulation being inhibited when the battery is connected to the rectified output of the alternator and being enabled when the windshield is connected to the rectified output of the alternator.

The system of the invention is applicable to the vehicle industry, and applies not only to equipment for cars for personal use, but also to utility vehicles and trucks.

BRIEF DESCRIPTION OF THE DRAWINGS

An embodiment of the invention is described by way of example with reference to the accompanying drawings, in which:

FIGS. 3(ba) to 3(bi) timing diagrams of the signals obtained by implementing the system of the invention as shown in FIG. 3a, and capable of obtaining the status diagrams of FIGS. 2(a) to 2(d)

DETAILED DESCRIPTION

The control system for raised-voltage defrosting of the electric windshield PBE of a motor vehicle in accordance with the present invention is initially described with reference to FIG. 1.

Figure 1:
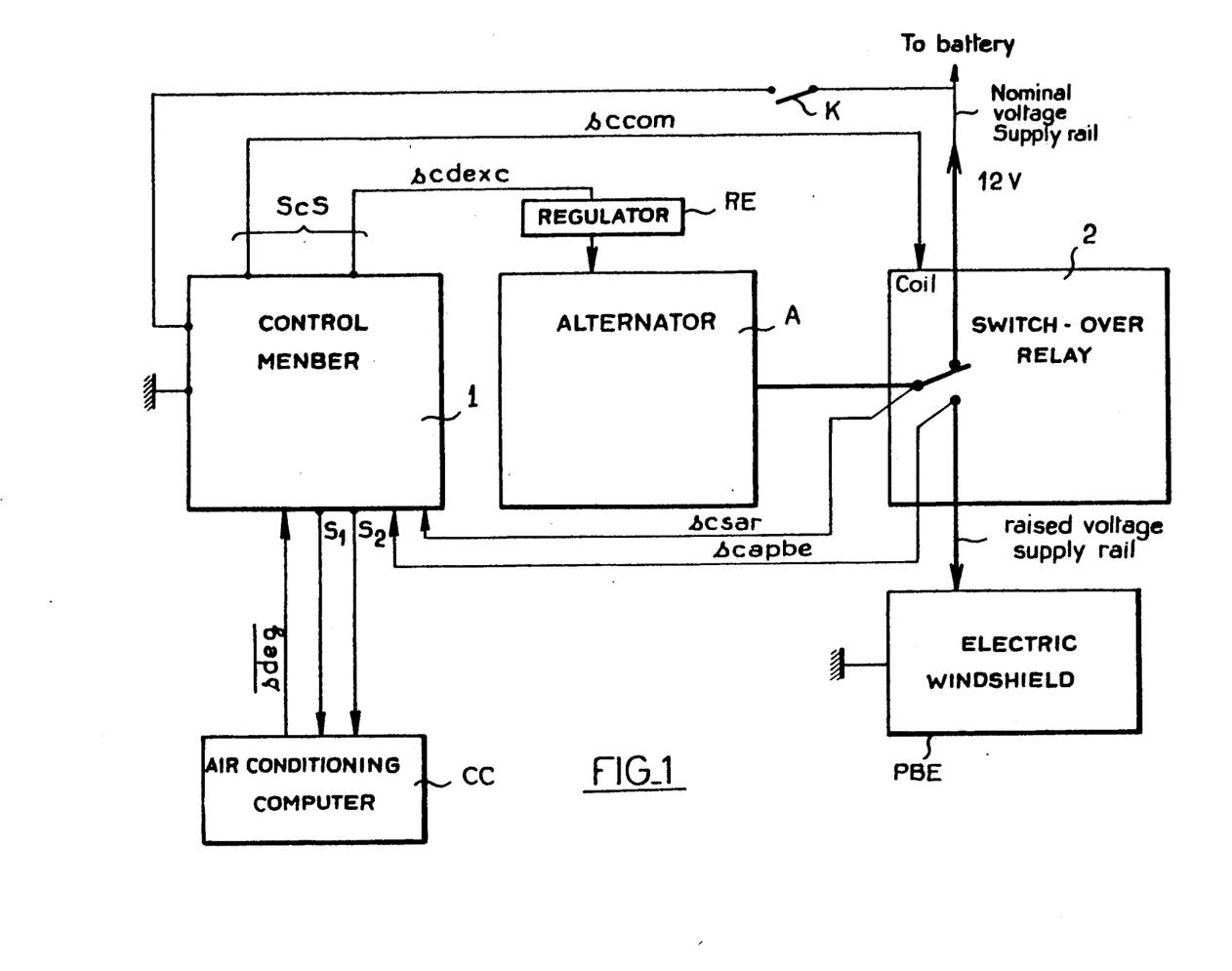
FIG. 1 is a block diagram of the system of the invention.

The system of the invention is intended to be used in a motor vehicle which is provided with an air-conditioning control computer CC in FIG. 1 and with a battery-charging alternator, with the excitation of the inductor of the alternator (which alternator is referenced A) being controlled by means of an excitation regulator RE. The regulator RE is preferably constituted by any multifunction type of regulator capable of detecting multiple faults. This type of regulator is well known in the art and is not described in greater detail in the following description.

As shown in FIG. 1, the system of the present invention includes a control member 1 connected to the air-conditioning computer CC. The control member receives a signal sdeg from the air-conditioning computer CC for triggering defrosting of the windshield PBE. It will be understood that in a particular embodiment, the air-conditioning computer CC may be constituted by an 8-bit microcontroller, for example, with the defrosting trigger signal sdeg being constituted by a binary signal having a high level and a low level, with switching from one level to the other corresponding to an instruction to begin defrosting the windshield, and with the reverse transition corresponding to an instruction to stop or end defrosting the windshield.

In accordance with another advantageous characteristic of the above-mentioned control member 1, this member transmits a plurality of status control signals S1, S2 to the air-conditioning computer CC, which signals serve to inform the air-conditioning computer CC about the state of the system, as described further on in the present description. The control member 1 is constituted by a logic unit delivering a plurality of sequential control signals SCS, as shown in FIG. 1.

In addition, as shown in the same figure, the control system of the invention includes switching means 2 connected to the rectified output from the alternator A. The abovementioned switching means 2 provide a connection between the rectified output of the alternator and either the network for distributing electrical energy at the nominal voltage of the vehicle batter or else the network for feeding the electric windshield PBE.

In accordance with an advantageous characteristic of the system of the invention, the plurality of sequential control signals SCS includes at least one control signal scdexc for controlling de-excitation of the inductor of the alternator, said signal being delivered to the excitation regulator RE. This connection between the excitation regulator RE and the alternator is not described in greater detail herein since it is known to the person skilled in the art under consideration. The above-mentioned plurality of sequential control signals SCS also includes a switch-over control signal sccom for controlling the switch-over means 2.

In accordance with a particularly advantageous aspect of the system of the invention, raised-voltage regulation is inhibited when the battery is connected to the rectified output from the alternator A, but is enabled when the windshield PBE is connected to the rectified output from the alternator A.

As also shown in FIG. 1, the control member 1 also receives a control signal scsar representative of the state of the voltage level at the rectified output from the alternator, and a control signal scapbe representative of the state of the feed to the electric windshield PBE. The role and function of these two signals are described in greater detail below.

Figure 2A:
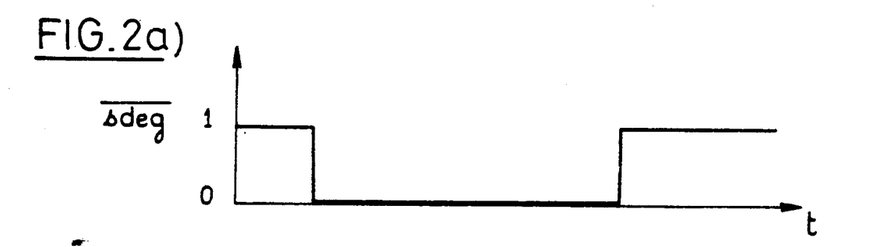
FIGS. 2(a) to 2(d) are status diagrams for the system of the invention as shown in FIG. 1.

According to a more particularly advantageous aspect of the system of the invention, as described in greater detail below with reference to FIGS. 2(a) to 2(d) which figures relate more particularly to a series of state diagrams of the control system of the invention as shown in FIG. 1, the signals of the plurality of sequential signals SCS following the occurrence of the signal sdeg for triggering windshield defrosting as delivered by the air-conditioning computer CC give rise, in succession, and as shown in FIG. 2(a) to the alternator A being de-excited by means of the de-excitation control signal scdexc in order to bring the said alternator from operating conditions in which its rectified output voltage is signal to the nominal charging voltage of the battery to conditions in which its output voltage is reduced. The alternator A is de-excited by an instruction for switching off the excitation current to the inductor of the alternator, with the voltage delivered by the alternator after it has been de-excited corresponding essentially to the voltage delivered because of the presence of remanent induction in the inductor. As shown at FIG. 2(c), the sequential control signals SCS then cause the switch-over means 2 to switch over so that the rectified output from the alternator is connected to the network for feeding the electric windshield PBE, as represented by the state of the signal sccom.

Figure 2B:
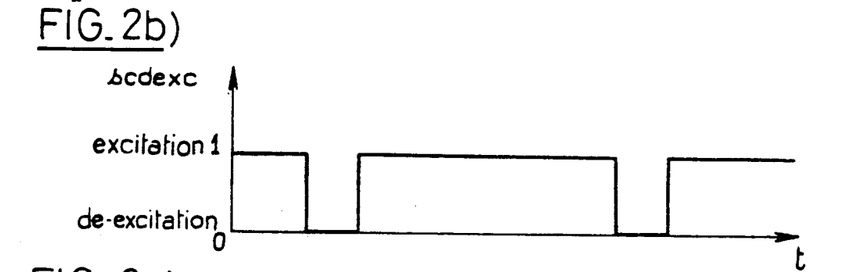
Figure 2C:
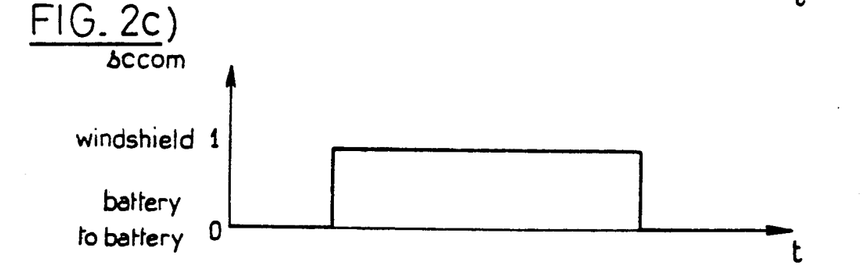
Figure 2D:
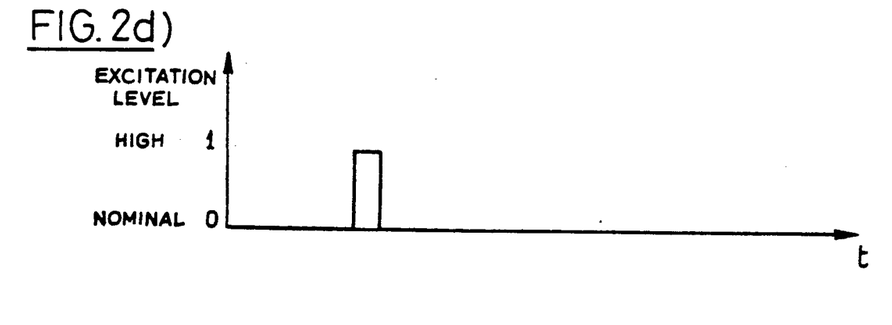

After the above switch-over, as shown at point (b) of FIG. 2b, the sequential control signals SCS then cause the excitation voltage of the alternator to be re-regulated, i.e. to return to conditions in which the alternator is excited. After the return to excitation conditions as shown at point (b) in FIG. 2b, and substantially simultaneously thereafter, the sequential control signals then cause, as shown at point (d) of FIG. 2d, the inductor of the alternator to be excited under raised-voltage supply conditions during a fraction of the defrosting time which is much less than the defrosting time as a whole.

On the disappearance of the defrosting trigger signal sdeg, as shown at FIG. 2(b), which disappearance is represented by the signal sdeg returning to level 1, the plurality of sequential control signals SCS then causes the alternator A to be de-excited again in order to take the said alternator from operator conditions in which it delivers a raised rectified output voltage in the absence of effective excitation to conditions in which its output voltage is reduced by switching off the excitation current in the inductor, as described above.

After the above de-excitation has taken place, as represented at FIG. 2(b), the sequential control signals SCS then cause the switching means 2 to switch over so as to provide a connection between the rectified output of the alternator and the electrical power distribution network at the nominal voltage of the vehicle, after which the inductor of the alternator A is excited again under conditions such that its rectified output voltage is equal to the nominal charging voltage of the battery.

A more detailed embodiment of a control member 1 suitable for obtaining state diagrams as shown at FIGS. 2(a) to 2(d) is described with reference to FIGS. 3a and 3(ba) to 3bi).

Figure 3A:
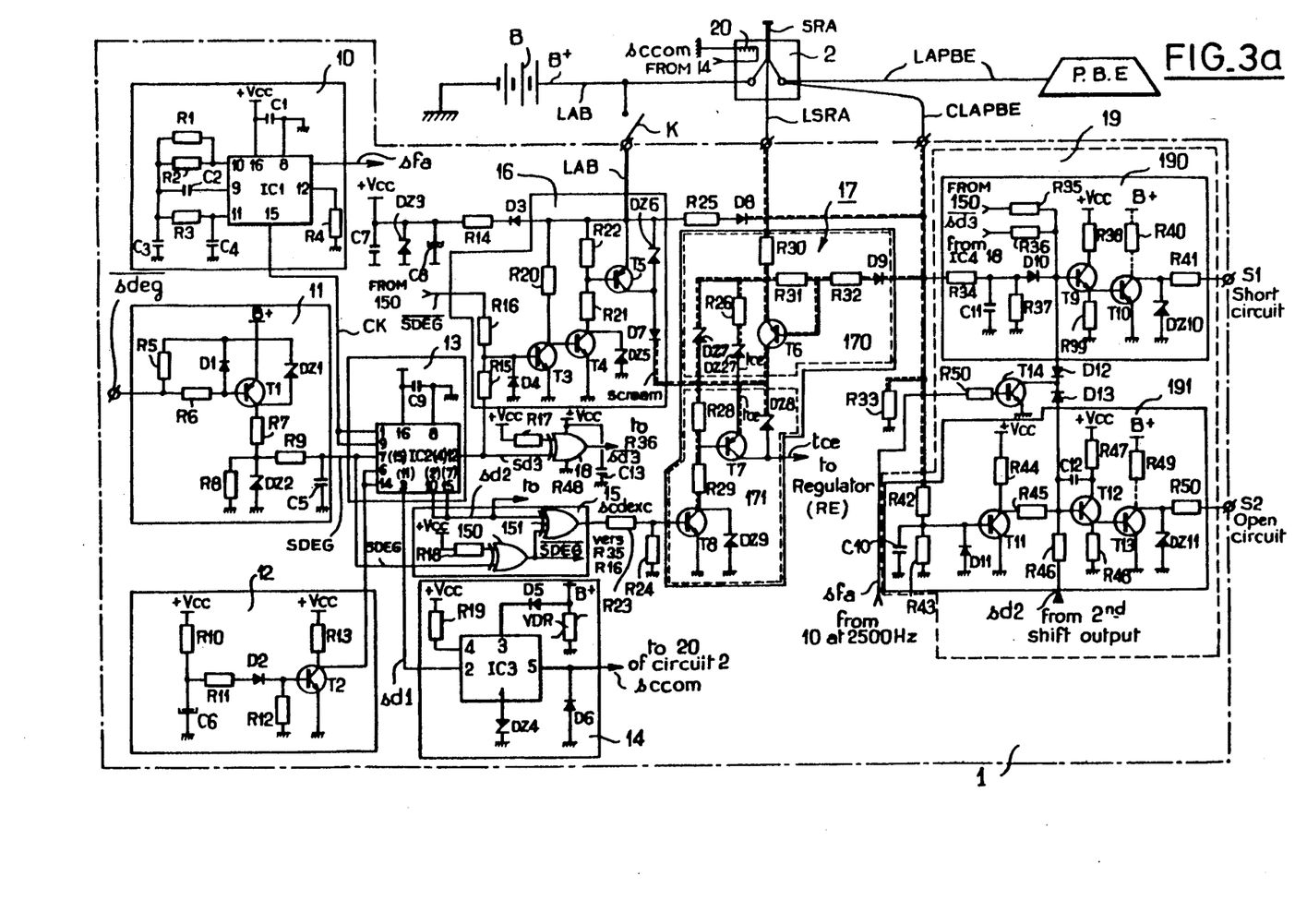
FIG. 3a is a circuit diagram of a non-limiting and advantageous particular embodiment of the system of the invention as shown in FIG. 1.
Figure 3B:
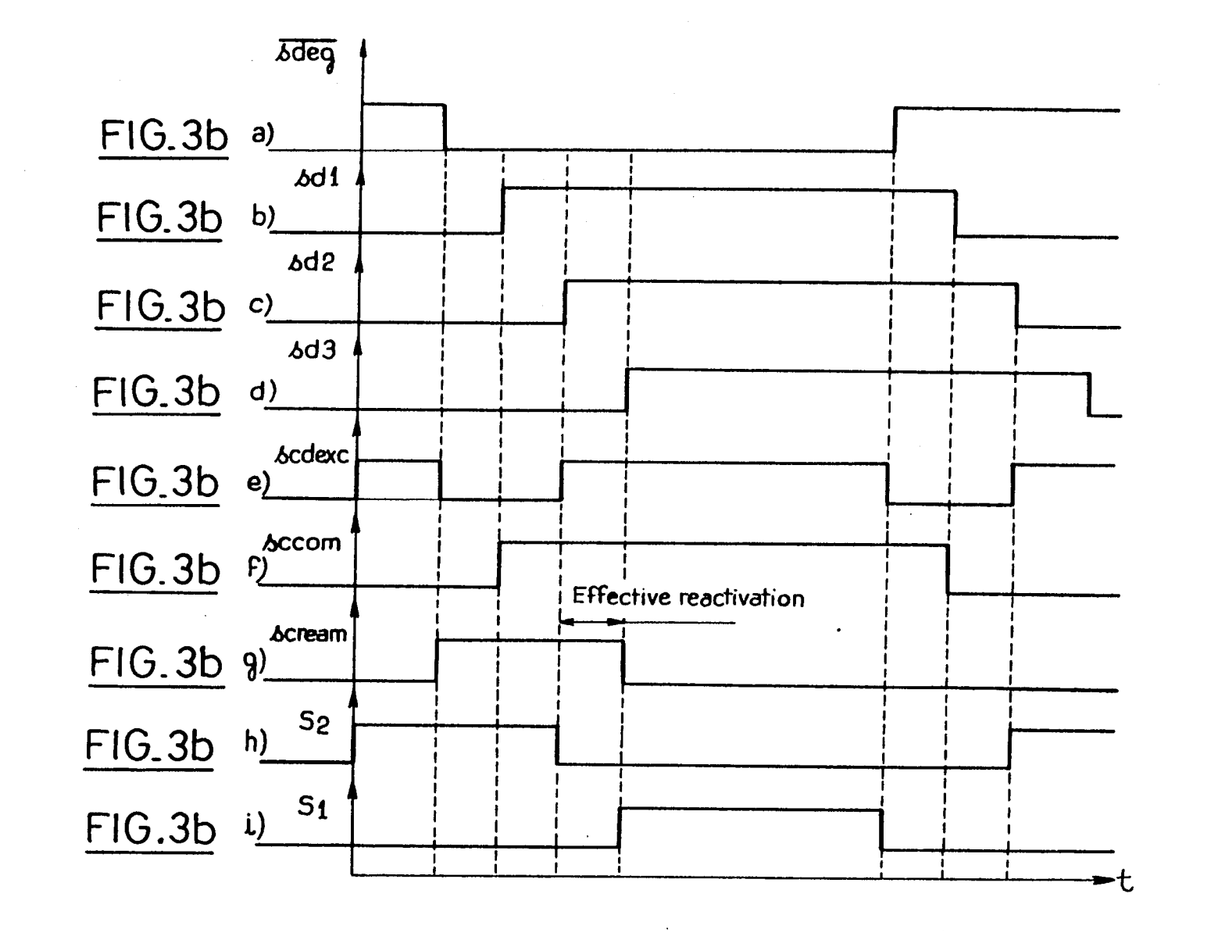

In above-mentioned FIG. 3a, the control member 1 advantageously comprises a reference clock 10 delivering calibrated pulses Ck at a determined recurrent frequency. For example, the clock 10 may delivery the signals Ck in the form of pulses at a frequency of 5 Hz. The clock may be constituted, for example, by means of an integrated circuit sold in France under the reference HEF 4060, with resistors R1 to R4 and capacitors C1 to C4 corresponding to components used for implementing this type of integrated circuit as specified by the manufacturer.

Thus, as also shown in FIG. 3a, the defrosting trigger signal $\overline{sdeg}$ delivered by the air-conditioning computer normally corresponds, as described above, to a logic signal taking up either a high level or a low level.

In order to satisfy the requirements of power characteristics in the connections between the control module and the air-conditioning computer, an interface module 11 may be provided in the control member 1 in order to ensure that an appropriate value of current flows between the two systems, i.e. the module and the computer. Advantageously, the interface module 11 may comprise a transistor T1 connected as an emitter-follower and powered from the positive terminal B+ of the battery B shown in FIG. 3a. Bias resistors R5, R6, R7, R8, and R9, diode D1, zener diodes DZ1 and DZ2, and capacitor C5 correspond to conventional components for biasing the transistor T1, for enabling a current to flow between the control module and the air-conditioning computer, and for transmitting a complemented or inverted version to the logic circuit per se of the defrosting trigger signal $\overline{sdeg}$ as produced by the above-mentioned computer. The output signal from the interface 11 is reference SDEG and is exactly the inverse of the signal $\overline{sdeg}$ generating by the air-conditioning computer.

In addition, as shown in FIG. 3a, the control member 1 advantageously includes a reset to zero module witch, on being switched on, resets the logic circuit of the control member 1 to 0 as described below.

The reset to zero module 12 may comprise, for this purpose, a transistor T2 biased by resistors R10, R11, R12, and R13, a diode D2, and a capacitor C6, with the transistor T2 being powered from the power supply voltage +Vcc, said power supply voltage corresponding to the power supply voltage fed to the entire electronic portion of the system. By way of non-limiting example, the power supply voltage +Vcc may be taken to be equal to +5 volts. As soon as the system is switched on, the transistor T2 as biased by a resistance-capacitance circuit R10-C6 delivers a voltage in the form of a pulse on its collector or at resistor R13, which pulse is used for resetting the logic circuits to zero, as described below.

As also shown in FIG. 3a, the control member 1 advantageously includes a shift register 13 having a clock input on which it receives the above-mentioned clock pulses Ck, and a shift input on which it receives the defrosting trigger signal SDEG as delivered by the interface from the signal generated by the air-conditioning computer CC. In conventional manner, shift register comprises a plurality of successively incremented shift outputs. The shift represented by each sift output corresponds substantially to a determined number of given clock frequency pulses.

As also shown in FIG. 3a, the control member 1 also includes a first interface circuit 14 having an input terminal receiving the shifted signal sd1 delivered by a first shift output from the shift register 13 and delivering the power switch-over control signal sccom to the to the switch-over means 2.

By way of non-limiting example, the shift register 13 may be constituted by an integrated circuit sold in France under reference HEF 4015, with the capacitance C9 corresponding to the specifications provided by the manufacturer of this integrated circuit.

Similarly, the first interface circuit 14 may be constituted by an integrated circuit sold in France under reference TSP05, with the resistor R19, the diodes D5 and D6, and the zener diode DZ4 corresponding to components whose characteristics are specified by the manufacturer. The device VDR serves to stabilize voltage.

Naturally, as shown in FIG. 3a, the switching means 2 may be constituted by a switch-over relay whose switching input terminal is connected to the rectified output SRA from the alternator and whose switching output terminals are connected respectively to the terminal B+ of the battery B and to the electric windshield PBE via a battery feed line LAB and via an electric windshield feed line LAPBE. The relay constituting the switch-over means 2 includes a control coil 20 which is connected to the output of the first interface circuit 14, thereby receiving the switch-over control signal sccom.

As also shown in FIG. 3a, the control level 1 includes a second interface circuit 15 having a first input terminal on which it receives the shifted signal sd2 delivered from a second shift output of the shift register 13, and having a second input terminal on which it receives the defrosting trigger signal SDEG. The second interface circuit 15 mentioned above delivers a signal scdexc at one of its outputs for controlling de-excitation of the alternator A. This signal consists in a signal obtained by performing an exclusive-OR type logic combination between the inverted defrosting trigger $\overline{SDEG}$ and the shifted signal sd2 delivered by the second shift output from the shift register 13.

The control member 1 also includes a third interface circuit 16 having a first input terminal receiving the defrosting trigger signal SDEG delivered by the air-conditioning computer CC (after inversion), and a second input terminal receiving the shifted signal sd3 delivered by the third shift output from the shift register 13. This third interface circuit delivers a signal scream controlling reactivation of the alternator, as described below. The signal scream for controlling reactivation of the alternator consists in a signal obtained by a logic NOR type combination between the inverted defrosting trigger signal $\overline{SDEG}$ and the shifted signal delivered by the third output from the shift register 13.

Finally, the control member 1 includes a circuit 17 for controlling the excitation regulator RE and comprising, connected in series with the excitation control input terminal of the regulator: a circuit 170 for setting the excitation control voltage; and a switching circuit 171. The circuit 170 for setting the excitation control voltage is connected to the alternator's rectified output SRA and serves, in this case, to enable the defrosting control signal SDEG to generate an excitation control voltage tce having two distinct values. The switching circuit 171 has switching input terminal on which it receives the excitation control voltage tce delivered by the circuit 170 for setting the excitation control voltage. The switching circuit 171 provides on an output terminal, either transmission to the excitation regulator of the excitation control voltage tce at one or other of its two values, or else disconnection of this excitation control voltage, thereby either exciting the inductor of the alternator A to obtain a rectified alternator voltage under raised-voltage conditions or under nominal battery-charging voltage conditions, or else de-exciting the inductor of the alternator A.

There follows a more detailed description of the second and third interface circuits 15 and 16 and of the circuit 17 for controlling the excitation regulator, with reference to the above figure.

In this figure, the second interface circuit 15 includes an inverter 150 constituted by a two-input exclusive-OR type logic circuit. The first input of the inverter circuit 150 is connected to the reference power supply voltage +Vcc and its second input is controlled by the defrosting trigger signal delivered by the air-conditioning computer. The output from the inverter circuit 150 provides an inverted signal $\overline{SDEG}$. The interface 15 also includes an exclusive-OR type logic circuit 151 which has its first input receiving the inverted signal $\overline{SDEG}$ delivered by the inverter circuit 150, and a second input which receives the shifted signal sd2 delivered by the second shift output from the shift register 13. The output from the exclusive-OR logic type circuit 151 constitutes an output from the second interface circuit 15 and it delivers a signal for controlling de-excitation of the alternator, said signal being reference scdexc.

As also shown in FIG. 3a, the third interface circuit 16 includes two inputs connected to two resistors R15 and R16. A first input terminal, resistor R16, receives the inverted defrosting trigger signal $\overline{SDEG}$ delivered by the output from the inverter circuit 150, and a second input terminal, resistor R15, receives the shifted signal sd3 delivered by the third shift output from the shift register 13. The third interface circuit 16 also includes a power control stage comprising two NPN type transistors T3 and T4 connected in cascade. The base of transistor T3 is directly connected to the midpoint between the two resistors and the base of the transistor T5 is connected to the collector of the transistor T3.

As can be seen in FIG. 3a, the transistors T3 and T4 are fed with battery voltage via the battery feed line LAB connected to the ignition switch K or directly via the B+ terminal of the battery.

In addition, the transistors T3 and T4 are connected in a common emitter configuration and their collector circuits are respectively loaded by resistor R20 and by resistors R21 and R22. The feed voltage B+ is also connected via a diode D3 and a resistor R14 to a zener diode DZ3 and to two filter capacitors C7 and C8 in order to provide the power supply voltage +Vcc for the logic circuits.

In addition, the third interface circuit 16 also includes an output transistor T5 of complementary PNP type, with the base of the transistor T5 being connected to the midpoint between the resistors R21 and R22. The collector of transistor T5 is connected to the midpoint of a diode bridge DZ6, D7, with the diode D7 being connected in the forward direction relative to transistor T5 in order to constitute a signal delivering the alternator reactivation control signal, which signal is referenced scream, the function of this signal being described below.

FIG. 3a also shows a particularly advantageous but non-limiting implementation both of the circuit 170 for setting the excitation control voltage and of the switching circuit 171.

In the above-mentioned figure, and as shown, the circuit 170 for setting the excitation control voltage advantageously comprises a first divider bridge constituted by two resistors R30 and R26 connected in series together with a zener diode DZ27. The divider bridge has its input terminal, resistor R30, connected to the rectified output form the alternator via an alternator rectified output 9 LSRA in FIG. 3a. The circuit 170 for setting the excitation control voltage also includes a switching transistor T6 whose collector-emitter switching terminals are connected in parallel with the series element constituted by the resistor R26 and the zener diode DZ27. The base of the transistor T6 is connected to the midpoint of a second divider bridge constituted by two resistors R31 and R32 and a diode D9. The second divider bridge thus connects the midpoint of the first divider bridge, i.e. the point common to the resistors R30 and R26, to the raised-voltage feed terminal for the electric windshield PBE, said terminal being connected to the electric windshield feed line LAPBE. In addition, a zener diode DZ7 is connected in parallel with the series circuit constituted by the resistor R27 and by the zener diode DZ27. Depending on the switching position of the transistor T6, the circuit 170 for setting the excitation control voltage delivers the excitation control voltage tce at one or other of its two values. The operation of the circuit for setting the excitation control voltage 170 is described below.

Finally, the switching circuit 171 as shown in FIG. 3a advantageously, but in non-limiting manner, comprises a switching transistor T7 used for transmitting once or other of the values of the excitation control voltage tce to the regulator RE, or else, on the contrary, for preventing any such voltage being transmitted. In addition, a divider bridge is provided constituted by resistors R28 and R29 in series and by zener diode DZ9, this bridge having an input terminal constituted by the resistor R28 connected to a common point in the circuit 170 for setting the excitation control voltage between the transistor T6 of said circuit and the output terminal constituted by one of the terminals of zener diode DZ27 of the first divider bridge therein.

The switching transistor T7 as shown in FIG. 3a has its emitter connected to the above-mentioned common point, i.e. to the input terminal of the divider bridge R28, R29 and to the output terminal of the zener DZ27 and to the collector of transistor T6, while the base of the control transistor T7 is itself connected to the midpoint of the divider bridge, i.e. the common point between resistors R28 and R29.

The collector of switching transistor T7 constitutes the output of the switching circuit 171, which output is connected to the regular RE, and more particularly to the so-called "sense" input which serves to convey information to the regulator concerning the rectified output voltage from the alternator.

As also shown in FIG. 3a, the switching circuit 171 includes a transistor T8 for controlling switching, having its collector connected to the common point between the zener diode DZ9 and the resistor R29 of the divider bridge and having its emitter terminal connected to system ground. The switching control transistor T8 is connected as a common-emitter circuit with the base of this transistor being controlled by the alternator de-excitation control signal scdexc, which signal is delivered by the second interface circuit 15 via two voltage and current level-matching resistors R23 and R24.

A more detailed description of the overall operation of the control member 1 as shown in FIG. 3a is given below with reference to FIGS. 3(ba) to 3(bz) in order to show how the successive system states as shown in FIG. 2 are obtained.

FIG. 3(ba) shows the defrosting trigger signal $\overline{\text{sdeg}}$ as delivered by the air-conditioning computer CC. Thus, by way of non-limiting example, defrosting is triggered when this signal changes from its high level to its low level, with the transition being triggered by the air-conditioning computer and corresponding to the computer issuing an instruction to trigger defrosting.

FIGS. 3(bb), and 3(bd) show the states respectively of the first, second, and third shift outputs from the shift register 13. It may be observed that prior to the above-mentioned transition occurring in the defrosting trigger signal, all three above-mentioned shift outputs are at their low levels, which corresponds to their state after the entire system has been reset to zero by the above-described circuit 12. When a defrosting trigger instructions correspondent to the above-mentioned transition appears, the alternator de-excitation control signal scdexc as shown at FIG. 3bc switches immediately from its rest state which is at a high logic level following the overall reset to zero of the system, and it takes up its low logic state. Simultaneously, the alternator rectification control signal scream as shown at FIG. 3(bg) likewise switches instantaneous from its rest value, which after the general reset to zero of the system which was at its low logic level, changes to its high logic level, for reasons explained below. In the initial state, transistors T3, T4, and T5 of the first interface circuit 16 are respectively conducting, non-conducting, and non-conducting. The alternator reactivation control signal scream is at its low logic level under these conditions. When the defrosting trigger signal occurs, the inverted signal $\overline{\text{SDEG}}$ delivered by the inverter 150 is transmitted to the input of the interface circuit 15 via resistor R16, thereby switching over the transistors T3, T4, and T5 so that they become respectively non-conducting, conducting, and conducting. The alternator reactivation control scream then switches to its high logic value as shown at FIG. 3(bg). Simultaneously, as shown at FIG. 3(be), the alternator de-excitation control signal scdexc acts via control transistor T8 to omen switching transistor T7, thereby opening the "sense" circuit of the alternator regulator, thereby de-exciting it.

It will thus be understood that so long as the transistor T7 remains non-conducting, this circuit remains open and the reactivation control circuit scream does not actually correspond to the alternator A being reactivated by the regulator RE until the switching transistor T7 becomes conducting again, i.e. until it transmits the excitation control voltage tce, as described below.

Following a transition constituting the instructing to defrost the windshield, and after one clock pulse has occurred, the first shift output from the shift register 13 delivers the first shifted signal sd1 which corresponds to a transition from low logic level to high logic level shifted by 3 to 4 clock pulses Ck relative to the occurrences of the defrosting trigger signal $\overline{\text{sdeg}}$. The signal sd1 delivered by the shifted output of the first shift register is shown at FIG. 3(bb). This signal has the effect, via the power switching circuit 14 of giving rise immediately to the switchover control signal sccom which enables excitation current to be applied to the coil 20 of the switchover means 2. The switchover relay 2 which was providing a connection between the rectified output from the alternator and the battery B serves to interrupt this connection instantaneously and to provide a new connection between the rectified output of the alternator and the electric windshield line LAPBE. Thus, as can be seen in FIG. 3(ba), the switchover control signal sccom is absolutely synchronous with the signal sd1 delivered by the first shift output from the shift register 13.

Following the occurrence of the transition corresponding to defrosting being triggered, and 4 to 5 clock pulses Ck after said transition, the second shift output of the shift register 13 delivers a signal sd2 shown at FIG. 3(bc), with this signal corresponding to the signal shifted by 4 to 5 clock pulses. The signal sd2 delivered by the second shift output of the shift register 13 has the effect, via interface circuit 15, of generating the alternator de-excitation control signal scdexc by means of an exclusive-OR type of combination between the signal sd2 and the defrosting trigger signal SDEG (and particularly the inverted defrosting trigger signal $\overline{\text{SDEG}}$). The effect of the above-mentioned de-excitation control signal is to cause the transistor T7 to conduct again, with the alternator de-excitation control signal scdexc returning to its high logic level and bridging the transistor T7 to its initial state on the occurrence of the signal sd2 delivered by the second shift output of the shift register 13. The excitation control voltage tce is thus transmitted by the circuit 170 for setting the excitation control voltage, as described below. In the initial state, i.e. after the entire control member 1 has been reset to zero by the reset to zero circuit 12, the initial state of the circuit 170 for setting the excitation control voltage corresponds to a state in which the transistor T6 is normally conducting, with the series circuit or assembly constituted by the resistor R26 and the zener diode DZ27 being normally short-circuited. In this initial situation, the rectified output from the alternator delivers a voltage corresponding to the nominal charging voltage of the battery and the excitation control voltage tce transmitted by the switching transistor T7 to the input of the regulator RE corresponds to an excitation control voltage for obtaining a rectified alternator voltage corresponding to the nominal voltage of the battery. Naturally, it will be understood that in this case, the regulator RE provides the essential functions of a multifunction regulator when operating under these conditions, with the rectified voltage from the alternator possibly fluctuating about the nominal charging voltage of the battery corresponding to this mode of regulator operation. When the switchover relay 2 switches over, i.e. after the switchover control signal sccom has switches to a high level logic value, the switching over of the relay constituting the switchover means 2 has the effect (due to the moving member of the relay switching over to put the alternator rectified output SRA into communication with the electric windshield feed line LAPBE), of causing a voltage corresponding to the nominal battery voltage to be applied to the input of the regulator RE via the switching transistor T7 and the transistor T5 which is connected to the positive terminal B+ of the battery via the battery feed line LAB and the ignition key switch K. The inductor of the alternator is excited in full field so the alternator reactivation control signal scream then corresponds to effective reactivation of the alternator since the alternator de-excitation control signal has been eliminated, with this stage of effective reactivation being represented by FIG. 3(bg).

Simultaneously, the rectified output voltage from the alternator increases because of the full field excitation of the inductor and the transistor T6 switches off, having the effect of releasing the series circuit constituted by the resistor R26 and the zener diode DZ27, with the alternator A operating under conditions of raised excitation and raised voltage. Steady state operating conditions of the alternator A are obtained with the value of the resistor R26 being selected in such a manner that the voltage delivered via the transistor T7 (which is then conducting) to the input circuit of the regulator RE corresponds substantially to a rectified output voltage from the alternator of about 60 volts to 70 volts.

In accordance with an another advantageous characteristic of the control member 1 shown in FIG. 1, following a transition corresponding to defrosting being triggered as shown at FIG. 3(ba), the third shift output from the shift register 13 delivers a signal sd3 after 5 to 6 clock pulses. Via resistor R15 of divider R15, R16 in the third interface 16, the signal sd3 has the effect of switching over the transistors T3, T4, and T5, which naturally has the effect of returning the reactivation control signal scream to its low level logic value, thereby limiting the effective reactivation of the alternator. Since the transistor T6 is non-conducting, excitation of the alternator via the regulator RE then occurs via the rectified output of the alternator connected via the rectified alternator output line LSRA, the resistor R30, the resistor R26, the zener diode DZ27, and the conducting collector-emitter junction of transistor T7 to the input circuit of the regulator RE.

The above embodiment of FIG. 3a as explained with reference to the timing diagrams of FIGS. 3(ba) and 3(bi) and in particular with FIGS. 3(ba) thereof eliminates faults that could have disastrous consequences. The above-described circuits for the control member 1 make it possible to control the regulation level of the voltage in a manner which depends on the state of the switching device or the switchover means 2 for switching over the rectified output from the alternator either to the battery or to the electric windshield PBE. This circuit does indeed prevent higher-voltage regulation taking place when the battery is connected to the rectified output of the alternator, and it allows it to take place only when the alternator is indeed connected to the electric windshield PBE.

It will be understood that the transistor T6 of the circuit 170 for setting the excitation control voltage switches off only when the relay constituting the switchover means 2 directs energy from the alternator in particular from the rectified alternator output SRA to the windshield PBE. On the above-mentioned transistor T6 switching off, it is the series connection of the resistor R26 and the zener diode DZ27 with the input circuits of the regulator via the transistor T7 that makes it possible to raise the regulation level to a high voltage value, i.e. to cause the alternator to operator under high voltage conditions, thereby defrosting the electric windshield PBE. Otherwise, so long as the switchover means 2 direct alternator energy in particular from the rectified alternator output SRA to the battery B+, the transistor T6 is conducting. Under such circumstances, if a fault holds the transistor T6 in the non-conducting position, the zener diode DZ27 grounds the input circuit to the regulator RE, thereby switching off the excitation current to the alternator.

By way of non-limiting example the above function may be provided using a multifunction regulator as sold by Motorola under the reference YV16.

In addition, in the embodiment shown in FIG. 3a, the control member 1 is unusual in having a limited effective reactivation time of about 0.5 second to 1 second corresponding to a few periods of the clock pulses Ck, as shown in particular by FIG. 3(bg).

Under normal operating conditions of the circuits for feeding the electric windshield, i.e. in the absence of faults short-circuiting the electric windshield feed line LAPBE, the above-mentioned reactivation duration suffices for raising the value of the rectified voltage output from the alternator at SRA enabling the alternator to be activated and to continue being activated throughout the defrosting period, i.e. for several minutes. However, if the electric windshield feed line is short-circuited, the voltage at the output from the alternator remains zero, as does the voltage on the input circuit to the regulator. Consequently, the excitation current in the alternator A is zero after the effective reactivation time of about 0.5 seconds to 1 second, depending on the frequency of the clock pulses Ck. The alternator is therefore not activated and it delivers no current. Consequently, the alternator delivers energy into a short-circuit only during a very short period of time of about 0.5 seconds to 1 second, instead of for several minutes as in the above-mentioned prior art circuits, and naturally this greatly reduces the risk of fire.

It is naturally advantageous in the embodiment shown in FIG. 3a to make provision for any kind of abnormal operation in the system for feeding the electric windshield with a raised voltage so as to avoid any risk of raised-voltage being delivered when not wanted, either because there is a short circuit in the feed line to the electric windshield, or because this line is open circuit due to a corresponding fault.

In order to satisfy the above-mentioned aim, and as shown in FIG. 3a in particular, the control member 1 may advantageously include a circuit 19 for detecting feed faults in the defrosting circuits of the electric windshield PBE.

As shown in FIG. 3a, the fault detection circuit 19 advantageously comprises a module 190 for detecting short circuiting of the high voltage feed line LAPBE for the electric windshield, and a module 191 for detecting the same high voltage feed line LAPBE for the electric windshield being open circuit.

In the embodiment shown in FIG. 3a, the module 190 for detecting short circuiting of the high voltage feed line for the electric windshield may comprise an input state forming a divider bridge using resistors R34 and R37 and in fact constituting a divider for generating a reference voltage. The input of this divider bridge, i.e. the resistor R34, is connected to the feed line LAPB for the electric windshield PBE. Naturally, a filter capacitor C11 is provided in parallel with the resistor R37 in order to filter the reference voltage delivered by the divider bridge.

In addition, the module 190 for detecting short circuiting may also have a switching state as shown in FIG. 3a, said switching stage including a cascade connection with a first transistor T9 whose base is connected to the midpoint of the divider bridge via a diode D10.

The first transistor T9 is powered by the supply voltage +Vcc and thus constitutes an amplified stage. The base of this transistor T9 is controlled firstly by the inverted defrosting trigger signal $\overline{\text{SDEG}}$ as delivered by the inverter 150 of the interface circuit 15. The base of the first transistor T9 is also controlled by an inverted version of the shifted signal sd3 as delivered by the third shift output from the shift register 13.

The switching stage also includes a second transistor T10 powered from battery voltage B+, the base of this second transistor is connected to the emitter of the first transistor T9. The collector electrode of the second transistor T10 delivers a signal S1 to the air-conditioning computer CC, as shown in particular in FIG. 1 and a FIG. 3(bi). The signal S1 is a signal indicating a short circuit fault on the raised-voltage feed line to the electric windshield PBE.

The base of the transistor T9 is controlled via coupling resistors R36 and R36, whose other ends are connected firstly to the output from the inverter 150 and secondly to the output of an inverter 18, which inverter delivers a signal sd3 generated from the signal sd3 as received on a first input while the second input of the inverter is connected to a resistor R17 which is connected in turn to the voltage +Vcc. The inverter circuit 18 operates in analogous manner to the circuit 150 of the interface circuit 15. The output circuit of the transistor T10 includes a protective zener diode DZ10 connected in parallel between the collector and the emitter of the transistor T10, and a series resistor R14 connecting the collector of the transistor T10 to the output terminal on which the signal S1 is delivered. The operation of this short circuit detection module is described below with reference to FIG. 3(bi).

In the initial state of the system after it has been reset to zero by the reset to zero circuit 12, the switch-over means 2 is in such a position as to connect the rectified output SRA from the alternator to the battery B+. The electric windshield feed line LAPBE and a line CLAPBE for monitoring the electric windshield are connected to ground via a resistor R33, and to battery voltage of about 12 volts via a resistor R25 and a diode D8 (assuming that the ignition key K is switched on). Since the resistors R25 and R33 have resistances in a ratio of substantially 1 to 5, the voltage thus applied to the feed line LAPBE is above 5/6 of the nominal battery voltage. The very low effective impedance of the electric windshield PBE, about 3 $\Omega$ then causes a voltage of substantially zero to appear on the lines LAPBE and CLAPBE. In the initial state the signal $\overline{\text{SDEG}}$ delivered by the inverter 150 of the second interface circuit 15 and the signal sd3 delivered by the inverter 18 should normally be at logic level 1, thereby saturating the transistor T6 and thus T10 via resistors R35 and R36. The transistors T9 and T10, and also the transistors T12 and T13, constitute Darlington type circuits.

After a signal $\overline{\text{sdeg}}$ has appeared, the system switches over to the defrosting position and both signals $\overline{\text{SDEG}}$ and sd3 switch over from the high logic state to the low logic state, therefore no longer saturating the transistor T9. If there is no short circuit on the electric windshield feed line LAPBE, then the voltage present on said line is about 60 volts to 70 volts and suffices, via the divider bridge R34, R37 to saturate the transistor T9 which therefore does not change state. If there is a short circuit, the voltage present on the electric windshield feed line LAPBE under raised-voltage conditions, and thus also on the monitor line CLAPBE, is not sufficient to saturate the transistor T9 which therefore switches off, thus switching off the transistor T10 and consequently causing the output S1 connected to the air-conditioning computer to switch over from the low logic state to the high logic state, thereby indicating that there is a short circuit fault on the feed line LAPBE.

The module for detecting that the raised-voltage feed line LAPBE for the electric windshield is open circuit, as shown by way of non-limiting example in FIG. 3a, may include an input stage constituting a divider bridge, which bridge is constituted by resistors R42 and R43 in FIG. 3a. This divider bridge is connected to the monitor line CLAPBE for monitoring the raised-voltage feed line to the electric windshield, and also to system ground. Naturally, a filter capacitor C10 is provided for the midpoint between resistors R42 and R43.

The above-mentioned module 191 also includes a common-emitter transistor T11 fed from the feed voltage +Vcc, with the base of the transistor T11 being connected to the midpoint of the above-mentioned voltage divider. A diode D11 serves to protect the base circuit of the transistor T11.

In addition, and in the same manner as in the short circuit detection module 190, a switching stage is provided, which stage comprises a cascade connection including a first transistor T12 whose base is connected to the midpoint between two resistors R45 and 46. The resistor R45 is connected to the connector of transistor T11 and the resistor R46 is connected to the second shift output from the shift register 13.

The resistors R47 and R48 constitute bias resistors for the transistor T12 and the capacitor C12 constitutes a filter capacitor. A second transistor T13 constitutes the above-mentioned switching stage, said second transistor T3 is fed from the battery voltage B+ via a resistor R49, with the transistor T13 being connected in a common-emitter configuration. The base of transistor T13 is connected to the emitter of the first transistor T12 and the collector electrode of transistor T13 delivers a signal S2 representative of an open circuit fault on the electric windshield raised-voltage feed line LAPBE to the air-conditioning computer CC via an output circuit constituted by a resistor R50 and a zener protection diode DZ11.

Operation of the open circuit detection module 191 is described with reference to FIG. 3a and FIG. 3(bh). Naturally, the initial state of the electric windshield feed line LAPBE is identical to that described above for the short circuit detection module 190. Thus, before the switchover means 2 have switched over, with the alternator operating under nominal battery recharging conditions, the voltage on the electric windshield feed line although normally about 10 volts because of the divider bridge R25-R33, is in fact reduced to a very low value close to zero by virtue of the low resistance (about 3 $\Omega$) of the electric windshield PBE. The midpoint of the first divider bridge R42-R43 is likewise at a voltage close to the value zero.

It will naturally by understood that it is preferable for the monitor line CLAPBE of the electric windshield feed line to be directly connected to the switch-over terminal of the switch-over means 2 to which the electric windshield feed line LAPBE is itself connected. This makes it possible to monitor substantially all of the electric windshield feed line LAPBE under the following conditions.

If the electric windshield feed line LAPBE is interrupted, then the very low effective impedance of the electric windshield (about 3$\Omega$) no longer short circuits the line CLAPBE for monitoring the electric windshield feed line, and the voltage present on this monitor line is about 10 volts because of the above-mentioned divider bridge R25-R33.

In the initial state and in the absence of an open circuit fault on the electric windshield feed line LAPBE the transistor T11 is off, and consequently the transistors T12 and T13 are both conducting, so the signal S2 has a logic level corresponding to a low logic level and it retains this value when the transition occurs corresponding to an instruction to defrost the electric windshield. If there is an open circuit fault on the electric windshield feed line LAPBE, the windshield is no longer connected to the monitor line CAPBE, and as a result this line rises to a potential close to 10 V which is sufficient to saturate the transistor T11 via the divider bridge R42-R43. When the transistor T11 saturates, T12 and T13 are switched off, thereby switching the output S2 from the low logic level to a high logic level.

It will thus be understood that the signal S2 constitutes a fault signal representative of the electric windshield feed line LAPBE being open circuit, with this signal naturally occurring before the alternator is effectively reactivated, i.e. outside the period when the electric windshield is actually defrosting, since under raised-voltage conditions at the rectified output from the alternator the appearance of the raised voltage on the line CLAPBE for monitoring the electric windshield feed line would mask the reference voltage delivered by the first divider bridge R42-R43. To this end, in order to prevent the transistors T12 and T13 switching off by virtue of the transistor T11 saturating while the windshield PBE is being fed with a raised voltage, the second output sd2 from the shift register forces saturation of T12 and thus of T13 via resistor R47, thus avoiding erroneous signalling.

Given the presence of the modules for detecting short circuiting and open circuiting of the electric windshield feed line in the control member 1 as shown in FIG. 3a, it is also advantageous, in accordance with one of the aims of the system of the invention, to provide means for monitoring continuity in the corresponding detecting circuit.

To this end, and as shown in FIG. 3a, the fault detection circuit 19 advantageously includes a module for monitoring electrical continuity of the above-mentioned modules. This monitor module includes a transistor T14 connected in a common-emitter circuit with its base controlled by an audio frequency signal, said signal being reference saf in FIG. 3a and advantageously being delivered by the clock 10.

Preferably, but in non-limiting manner, the audio frequency signal sfa may have a frequency of about 2500 Hz. The collector of transistor T14 is connected via respective diodes D12 and D13 to the base electrodes of the transistors T9 and T12 with the diodes being reverses-biased relative to the transistors.

The audio frequency signal sfa provides pulse modulation on the signals S1 and S2 representative of short circuit or open circuit on the electric windshield feed line. The base of transistor T14 is connected to the corresponding clock output via a resistor R50.

By detecting modulation pulses at the frequency of the audio frequency signal sfa, which pulses should be present on a permanent basis, the air-conditioning computer CC can monitor the electric continuity of the connection of the abovementioned detection modules.

A system has thus been described for controlling raised-voltage defrosting of the electric windshield of a motor vehicle in a manner which is particularly advantageous given that the risks in prior systems inherent to feeding the defrosting circuits of an electric windshield with a raised-voltage have been substantially diminished, and even practically eliminated.

Figure 4A:
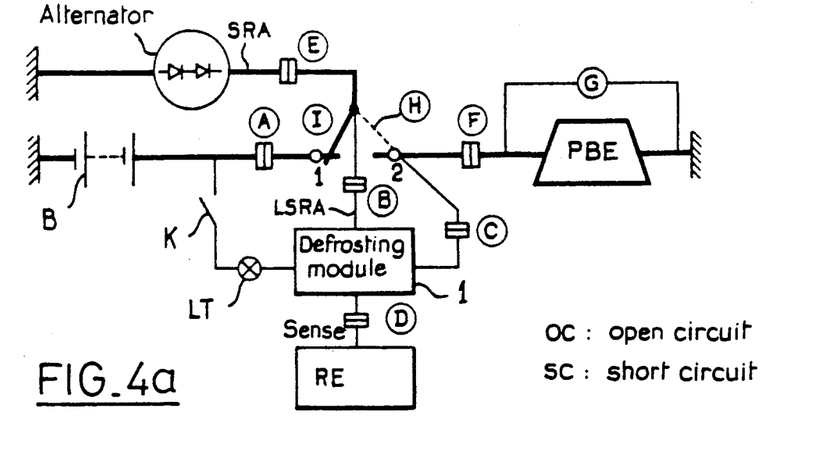
FIG. 4(a) is an electrical circuit diagram of an installation of an electrical power supply network for a motor vehicle provided with a system of the present invention showing the various faults that may occur in the installation, together with a table FIG. 4(b) summarizing the effects thereof on regulation, and how they are notified to the air-conditioning control computer and to the warning lamp LT.
Figure 4B:
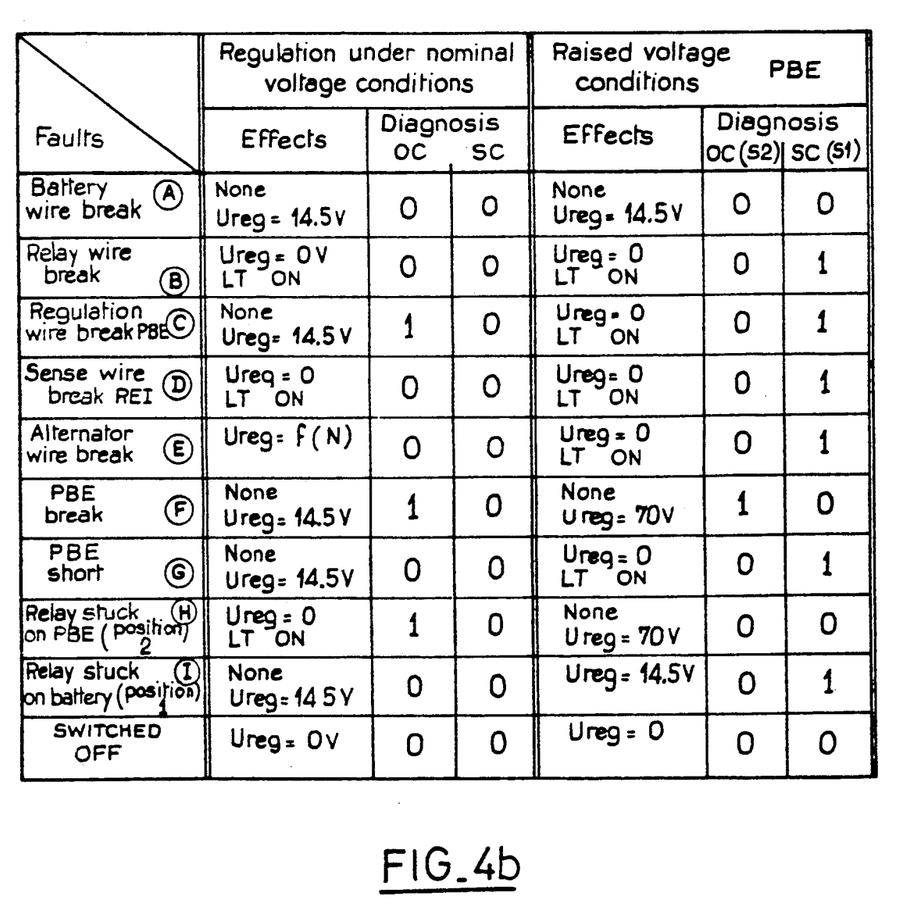

In particular, as also described with reference to FIGS. 4(a) and 4(b), the system shown in FIG. 3a makes it possible to indicate various different faults referenced A, B, C, D, E, F, H, and I, with the above-mentioned list of faults being characterized as a function firstly of regulation under nominal-voltage conditions at 14 volts for recharging the battery and secondly under raised-voltage conditions for feeding the electric windshields in order to defrost it.

The above-mentioned faults may be displayed by means of a display lamp LT connected in the ignition key line K and on using a regulator RE as described above.

Finally, the last line of the table as shown in FIG. 4 does not correspond to a fault situation but merely to the situation prior to the vehicle being switched on, i.e. when the ignition key K is open circuit.

We claim:
1. A system for controlling raised-voltage defrosting of an electric windshield in a motor vehicle, the system including an air-conditioning computer and a battery-charging alternator, excitation of the inductor of said alternator being controlled via an excitation regulator, wherein the system includes:
  a control member connected to said air-conditioning computer, said control member receiving a signal for triggering the defrosting of the windshield from said air-conditioning computer, and transmitting a plurality of state monitoring signals to said air-conditioning computer, said control member being constituted by a logic unit delivering a plurality of sequential control signals;
  switch-over means connected to the rectified output from the alternator and serving to connect said rectified output from the alternator, either to the battery for delivering electrical energy at the nominal voltage of the vehicle battery, or else to the windshield for feeding the electric windshield, said plurality of sequential control signals including at least:
  a signal for controlling de-excitation of the inductor of the alternator, said signal being delivered to said excitation regulator; and
  a switch-over control signal for controlling said switch-over means, with raised-voltage regulation being inhibited when the battery is connected to the rectified output of the alternator and being enabled when the windshield is connected to the rectified output of the alternator.

2. A system according to claim 1, wherein said plurality of sequential control signals, following the appearance of said windshield defrosting trigger signal delivered by said air-conditioning computer cause at least the following to happen in succession:
  de-excitation of the alternator to switch the alternator from operating conditions in which its rectified output voltage is equal to the nominal charging voltage of the battery to conditions in which its rectified output voltage is reduced;
  switch over of the switch-over means in order to connect the rectified output from the alternator to the windshield for feeding the electric windshield;

enabling re-regulation of the excitation voltage of the alternator;

enabling excitation of the alternator indicator under raised-voltage feed conditions during a fraction of the defrosting time;

followed, on the disappearance of said signal delivered by said air-conditioning computer for triggering windshield defrosting, by:

de-excitation of the alternator to switch it from operating conditions in which its rectified output voltage is raised to conditions in which its output voltage is reduced;

switching over the switch-over means in order to connect the rectified output of the alternator to the battery for distributing electrical energy at the nominal voltage of the vehicle; and enabling the inductor of the alternator to be excited under conditions in which its rectified output voltage is equal to the nominal charging voltage of the battery.

3. A system according to claim 1, wherein the said control member also receives:

a monitoring signal representative of the voltage level at the rectified output of the alternator; and a monitoring signal representative of the feed state of the electric windshield.

4. A system according to claim 1, wherein said control member includes:

a reference clock delivering calibrated pulses at a determined recurrent frequency;

a shift register having a clock input receiving said calibrated pulses and having a shift input receiving said windshield defrosting trigger signal delivered by the air conditioning computer, said shift register including a plurality of successively incremented shift outputs;

a first interface circuit having an input terminal receiving a shifted signal delivered by a first shift output from the shift register and delivering said switch-over control signal to said switch-over means;

a second interface circuit having a first input terminal receiving a shifted signal delivered by a second shift output from the shift register and a second input terminal receiving the defrosting trigger signal, said second interface circuit delivering the de-excitation signal for controlling de-excitation of the alternator, said de-excitation signal being constituted by a signal obtained by an exclusive-OR type logic combination between the defrosting trigger signal and the shifted signal delivered by the second shift output from the shift register;

a third interface circuit having a first input terminal receiving said defrosting trigger signal, and a second input terminal receiving the shifted signal delivered by a third shift output from the shift register, said third interface circuit delivering a signal for controlling reactivation of the alternator, the reactivation control signal constituting a signal obtained by logical NOR type combination between an inverted version of the defrosting trigger signal and the shifted signal delivered by the third shift output from the shift register; and an excitation regulator control circuit connected to the input terminal of the excitation regulator:

a circuit for setting excitation control voltage and connected to the rectified output of the alternator enabling, on the appearance of the defrosting trigger signal, two different excitation control voltage values to be generated; and a switching circuit having a switching input terminal receiving the said excitation control voltage, said switching circuit providing at its output terminal either one of its two values to the excitation regulator, or else cutting off said excitation control voltage, thereby to control the alternator to provide said raised-voltage conditions or said nominal battery-charging voltage conditions, or de-exciting the inductor of the alternator.

5. A system according to claim 4, wherein said second interface circuit comprises:

a two-input inverter circuit having a first input connected to receive a reference feed voltage +Vcc, a second input controlled by said defrosting trigger signal, and an output for delivering an inverted signal; and an exclusive-OR type logic circuit having a first input receiving said inverted signal, a second input receiving the shifted signal delivered by the second shift output, and an output constituting the output of the second interface circuit, for controlling de-excitation of the alternator.

6. A system according to claim 4, wherein the said third interface circuit comprises:

a first input terminal receiving said inverted defrosting trigger signal and a second input terminal receiving the shifted signal delivered by the third shift output from the shift register; and a power control stage comprising, connecting cascade:

first and second NPN transistors, the base of the first transistor being directly connected to the midpoint of a divider bridge and the base of the second transistor being connected to the collector of the first transistor, said first and second transistors being fed from battery voltage; and a third PNP transistor constituting an output transistor, the base of the third transistor being connected to the collector of the second transistor via a resistor bridge, the collector of said third transistor being connected to the midpoint of a diode bridge comprising a zener diode and a diode, the diode being connected in the forward direction relative to the third transistor in order to deliver the signal for controlling reactivation of the alternator.

7. A system according to claim 4, wherein said circuit for setting the excitation control voltage comprises:

a first divider bridge constituted by two resistors in series with a zener diode, said bridge being connected via its input terminal to the rectified output of the alternator; and a switching transistor whose collector emitter switching terminals are connected in parallel with a series circuit constituted by a zener diode and a resistor, the base of said transistor being connected to the midpoint of a second divider bridge constituted by two resistors and by a diode, said second divider bridge connecting the midpoint of said first divider bridge and a raised-voltage feed terminal for the electric windshield; wherein said circuit for setting the excitation control voltage delivering the excitation control voltage at one or other of its two values by the switching of the switching transistor.

8. A system according to claim 7, wherein said switching circuit comprises:

a switching transistor for transmitting the excitation control voltage to the excitation regulator at the two values of said voltage, or not transmitting said voltage;

a divider bridge, with its input terminal connected to a common point common to the output terminal of said first divider bridge of said circuit for setting the excitation control voltage and the switching transistor of said circuit, a control transistor having its emitter connected to said common point and its base connected to the midpoint of said divider bridge, its collector constituting the output of said switching circuit; and a switching control transistor whose collector is connected to a point common to a zener diode and a resistor of the divider bridge, whose emitter is connected to system ground, whose base is controlled by said signal for controlling de-excitation of the alternator delivered by the second interface circuit.

9. A system according to claim 1, wherein said control member further includes a fault detecting circuit for detecting a fault in the electric windshield defrosting system.

10. A system according to claim 9, wherein said fault detection circuit comprises:

a module for detecting short circuiting of the raised-voltage feed line for the electric windshield; and a module for detecting open circuit in the raised voltage feed line for the electric windshield.

11. A system according to claim 10, wherein said module for detecting short circuiting, comprises:

an input stage constituting a divider bridge generating a reference voltage, the input of the divider bridge being connected to the windshield feed line by a monitor line; and a switching stage comprising, in cascade:

a first transistor whose base is connected to the midpoint of said divider bridge, said first transistor being fed with a feed voltage +Vcc, the base of said first transistor being controlled firstly by an inverted defrosting trigger signal and secondly by a shifted signal delivered by a third shift output from a shift register; and a second transistor fed by battery voltage having its base connected to the emitter of the first transistor, its collector delivering a signal representative of a short circuit fault on the raised-voltage feed line of the electric windshield to the air-conditioning computer.

12. A system according to claim 10, wherein said module for detecting open circuit in the raised-voltage feed line, comprises:

an input stage constituting a first divider bridge connected between system ground voltage and said raised voltage feed line for the electric windshield;

a common-emitter transistor fed by a feed voltage +Vcc, the base of said transistor being connected to the midpoint of said first divider bridge; and a switching stage comprising in cascade:

a first transistor whose base is connected to the midpoint of a second divider bridge, said first transistor being fed by the feed voltage +Vcc, the base of said first transistor being controlled by a shifted signal delivered by a second shift output from a shift register; and a second transistor fed by battery voltage having its base connected to the emitter of the first transistor, its collector delivering a signal representative of an open circuit fault on the raised-voltage feed line of the electric windshield to the air-conditioning computer.

13. A system according to claim 10, wherein said fault detection circuit further includes a module for monitoring electrical continuity of said detecting modules, said monitoring module comprising a common-emitter transistor whose base is controlled by an audio frequency signal delivered by a reference clock, whose collector is connected via respective diodes to the bases of first transistors in a cascade connected pairs of transistors, with the diodes being reverse biased relative to said transistors, wherein the audio frequency signal serving to pulse modulate the signals representative of a short circuit fault or of an open circuit fault on the raised-voltage feed line of the electric windshield.

* * * * *